(12) United States Patent
Bilson

(10) Patent No.: US 7,780,400 B2
(45) Date of Patent: Aug. 24, 2010

(54) DEVICE FOR DETECTING A FRACTURE IN THE SHAFT OF A GAS TURBINE, AND GAS TURBINE

(75) Inventor: Christopher Bilson, Berlin (DE)

(73) Assignee: MTU Aero Engines GmbH, Munich (DE)

( * ) Notice: Subject to any disclaimer, the term of this patent is extended or adjusted under 35 U.S.C. 154(b) by 732 days.

(21) Appl. No.: 11/628,025

(22) PCT Filed: May 20, 2005

(86) PCT No.: PCT/DE2005/001042
§ 371 (c)(1),
(2), (4) Date: Apr. 24, 2007

(87) PCT Pub. No.: WO2005/116406
PCT Pub. Date: Dec. 8, 2005

(65) Prior Publication Data
US 2008/0069685 A1    Mar. 20, 2008

(30) Foreign Application Priority Data
May 29, 2004   (DE) .................. 10 2004 026 366

(51) Int. Cl.
*F01B 25/26* (2006.01)
(52) U.S. Cl. .................. 415/9; 415/14; 415/16; 415/118
(58) Field of Classification Search .............. 415/9, 415/14, 16, 118
See application file for complete search history.

(56) References Cited

U.S. PATENT DOCUMENTS

| 1,326,867 A | 12/1919 | Junggren |
| 2,815,818 A | 12/1957 | Douglass |
| 2,977,758 A | 4/1961 | Haworth et al. |
| 3,159,166 A | 12/1964 | Luedemann et al. |

(Continued)

FOREIGN PATENT DOCUMENTS

DE   197 27 296   1/1999

(Continued)

OTHER PUBLICATIONS

Office Action in U.S. Appl. No. 10/587,345, mailed Feb. 3, 2009, 11 pages, USPTO, Alexandria, VA, USA.

(Continued)

*Primary Examiner*—Igor Kershteyn
(74) *Attorney, Agent, or Firm*—W. F. Fasse; W. G. Fasse

(57) ABSTRACT

An arrangement is provided for detecting a shaft break on a rotor of a first turbine, especially a medium pressure turbine, of a gas turbine machine, especially an aircraft engine. A second turbine (11), especially a low pressure turbine, is positioned downstream from the first turbine. An actuating element (18) is positioned lying radially inwardly relative to a flow channel, between the rotor of the first turbine and a stator of the second turbine. A transmission element (22) is guided in the stator of the second turbine (11), in order to transmit a shaft break detected by the radially inwardly positioned actuating element (18) to a switching element (23) positioned radially outwardly relative to the flow channel on a housing (14) of the gas turbine.

17 Claims, 1 Drawing Sheet

U.S. PATENT DOCUMENTS

| | | | |
|---|---|---|---|
| 3,696,612 | A | 10/1972 | Berman |
| 3,887,147 | A | 6/1975 | Grieb |
| 3,989,408 | A | 11/1976 | Jaegtnes |
| 4,144,421 | A | 3/1979 | Sakai |
| 4,406,117 | A | 9/1983 | Rowen et al. |
| 4,473,998 | A | 10/1984 | King |
| 4,498,291 | A | 2/1985 | Jeffery |
| 5,301,499 | A | 4/1994 | Kure-Jensen et al. |
| 5,363,317 | A * | 11/1994 | Rice et al. .................... 702/34 |
| 5,411,364 | A | 5/1995 | Aberg et al. |
| 6,494,046 | B1 | 12/2002 | Hayess |
| 6,546,735 | B1 | 4/2003 | Monitz et al. |
| 6,607,349 | B2 * | 8/2003 | Mulera et al. .................. 415/1 |
| 7,002,172 | B2 | 2/2006 | Rensch |
| 7,043,896 | B2 | 5/2006 | Matthews |
| 7,207,768 | B2 | 4/2007 | Gordon et al. |
| 2003/0091430 | A1 | 5/2003 | Mulera et al. |
| 2007/0160457 | A1 | 7/2007 | Bilson |
| 2008/0178573 | A1 | 7/2008 | Metscher |

FOREIGN PATENT DOCUMENTS

| | | |
|---|---|---|
| GB | 903 945 | 8/1962 |
| GB | 982 292 | 2/1965 |
| GB | 1 239 349 | 7/1971 |
| GB | 1 374 988 | 11/1974 |
| GB | 2 002 857 | 2/1979 |
| GB | 2 303 225 | 2/1997 |
| JP | 03 121219 | 5/1991 |

OTHER PUBLICATIONS

Office Action in U.S. Appl. No. 10/587,345, mailed Nov. 4, 2009, 8 pages, USPTO, Alexandria, VA, USA.

* cited by examiner

DEVICE FOR DETECTING A FRACTURE IN THE SHAFT OF A GAS TURBINE, AND GAS TURBINE

FIELD OF THE INVENTION

The invention relates to an arrangement for the detection of a shaft break of a gas turbine. Moreover the invention relates to a gas turbine.

BACKGROUND INFORMATION

Gas turbines embodied as aircraft engines have at least one compressor, at least one combustion chamber and at least one turbine. Aircraft engines are known from the state of the art, which on the one hand comprise three compressors positioned upstream from the combustion chamber, as well as three turbines positioned downstream from the combustion chamber. The three compressors are a low pressure compressor, a medium pressure compressor as well as a high pressure compressor. The three turbines are a high pressure turbine, a medium pressure turbine, as well as a low pressure turbine. According to the state of the art, the rotors of the high pressure compressor and the high pressure turbine, of the medium pressure compressor and the medium pressure turbine, as well as of the low pressure compressor and the low pressure turbine are connected with one another respectively by a shaft, whereby the three shafts concentrically surround or enclose one another and thus are nested within one another.

If, for example, the shaft connecting the medium pressure compressor as well as the medium pressure turbine with one another breaks i.e. fractures, then the medium pressure compressor can no longer extract or take up any work from the medium pressure turbine, whereby then an excessive rotational speed or over-speeding rotation condition of the medium pressure turbine can result. Such a free rotation of the medium pressure turbine must be avoided, because thereby the entire aircraft engine can be damaged. Thus, for safety reasons, a shaft break in a gas turbine must be surely detectable, in order to interrupt a fuel feed to the combustion chamber upon the occurrence of the shaft break. Such a detection of a shaft break presents difficulties especially when the gas turbine, as described above, comprises three concentrically enclosing shafts that are thus nested within one another. In this case, especially the detection of a shaft break of the middle shaft, which couples the medium pressure turbine with the medium pressure compressor, presents difficulties.

SUMMARY OF THE INVENTION

Beginning from the above considerations, it is an object of the invention to provide a novel arrangement for the detection of a shaft break in a gas turbine.

The above object has been achieved by an arrangement for the detection of a shaft break in a gas turbine according to the present invention. The inventive arrangement serves to detect a shaft break on a rotor of a first turbine, especially a medium pressure turbine, of a gas turbine machine, especially an aircraft engine, whereby a second turbine, especially a low pressure turbine, is positioned downstream from the first turbine. The arrangement includes an actuating element that is positioned lying radially inwardly relative to a flow channel, between the rotor of the first turbine and a stator of the second turbine, and a transmission element guided in the stator of the second turbine, in order to transmit a shaft break detected by the actuating element positioned lying radially inwardly, to a switching element that is positioned lying radially outwardly relative to the flow channel on a housing of the gas turbine.

In the sense of the present invention, an arrangement for the detection of a shaft break in a gas turbine is proposed, which comprises a mechanical actuating element positioned lying radially inwardly for the mechanical detection of a shaft break, as well as a mechanical transmission element for the mechanical transmission of the shaft break detected by the actuating element to a radially outwardly lying switching element. The switching element is radially outwardly secured on a housing of the gas turbine. The structural assemblies of the inventive arrangement for the detection of a shaft break in a gas turbine, which are positioned lying radially inwardly relative to a flow channel and are thus difficult to access, are embodied as purely mechanical components and therefore have a high reliability. The switching element, which is connected with the control electronics of the aircraft engine and is embodied as an electrical or electronic switching element, is secured to be easily accessible radially outside on the housing of the gas turbine. Thus, the switching element is easily accessible for maintenance work.

The above object has further been achieved by an inventive gas turbine incorporating a shaft break detection arrangement according to the present invention as disclosed herein.

BRIEF DESCRIPTION OF THE DRAWINGS

An example embodiment of the invention will be explained in further detail in connection with the drawing, without being limited thereto. In that regard.

DETAILED DESCRIPTION OF AN EXAMPLE EMBODIMENT OF THE INVENTION

Figure 1:
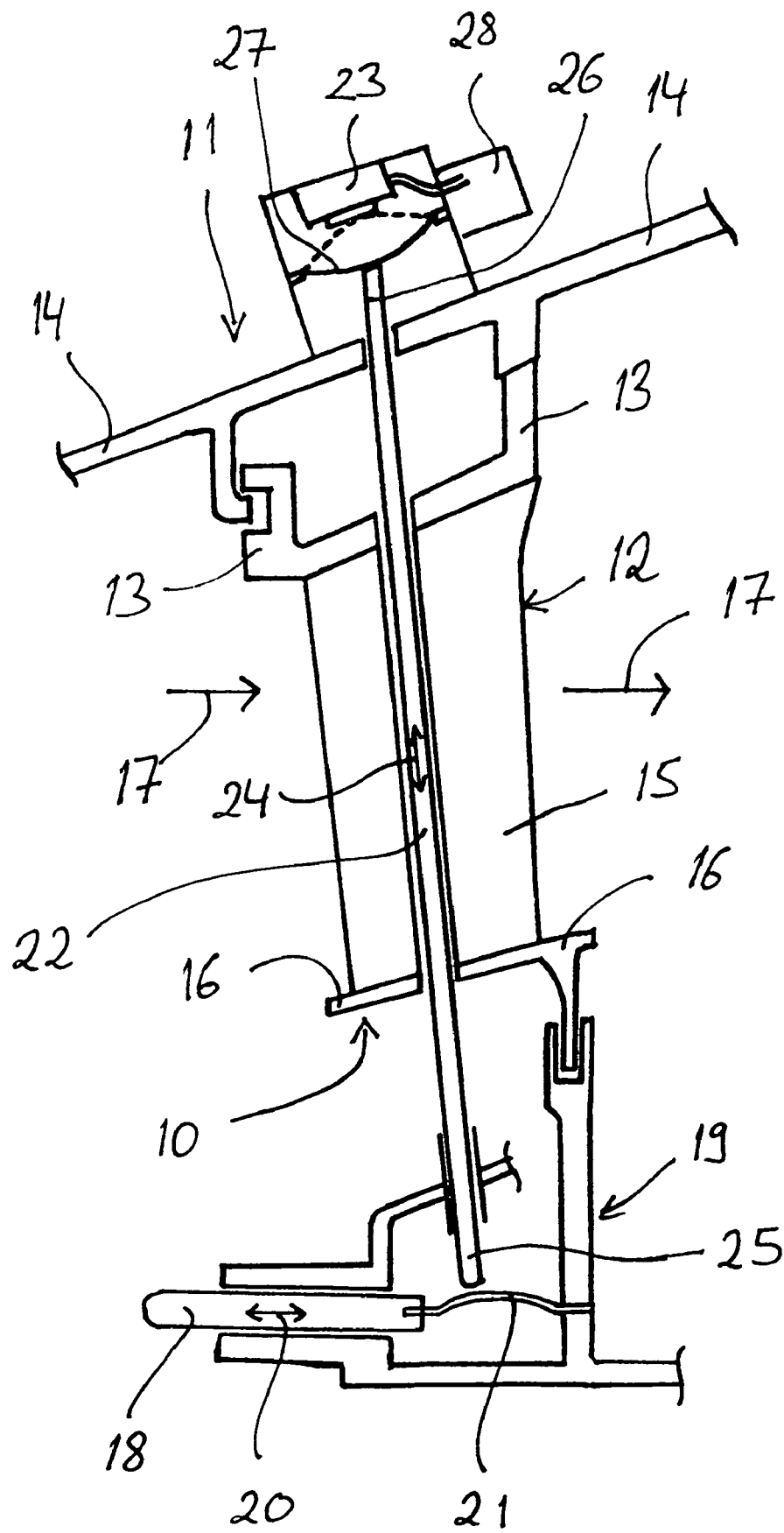
FIG. 1 shows a cut-out portion of an inventive gas turbine with an inventive arrangement for the detection of a shaft break in a gas turbine.

In the following, the present invention will be described in greater detail with reference to FIG. 1.

FIG. 1 shows a partial cut-out cross-section through an inventive gas turbine, namely an aircraft engine, in the area of a stator-side guide vane ring 10 of a low pressure turbine 11. The guide vane ring 10 of the low pressure turbine 11 shown in FIG. 1 is formed of plural fixed or stationary guide vanes 12 that are spaced apart from one another in the circumferential direction, whereby the guide vanes 12 are secured with a radially outwardly lying section 13 on a stator-side housing 14 of the gas turbine. Vane blades 15 of the guide vanes 12 of the guide vane ring 10 extend in the radial direction between the radially outwardly lying section 13 and a radially inwardly lying section 16 of the guide vanes 12 in the area of a flow channel of the low pressure turbine 11.

The flow direction through the flow channel is visualized by arrows 17 in FIG. 1. The guide vane ring 10 of the low pressure turbine 11 shown in FIG. 1 is the first guide vane ring of the low pressure turbine 11 as seen in the flow direction (arrow 17). A runner or rotor blade ring (not shown) of the low pressure turbine 11 is positioned downstream from this guide vane ring 10. A medium pressure turbine (not shown) is arranged upstream from the low pressure turbine 11. Thereby, a last runner or rotor blade ring (not shown) of the medium pressure turbine as seen in the flow direction borders on the first guide vane ring 10 of the low pressure turbine 11 as seen in the flow direction and as shown in FIG. 1. Preferably, a high pressure turbine is positioned upstream from the medium pressure turbine.

As already mentioned, in such gas turbines that comprise three turbines as well as three compressors, the rotors of the high pressure turbine as well as the high pressure compressor, the medium pressure turbine as well as the medium pressure compressor, as well as the low pressure turbine and the low pressure compressor are connected with one another respectively by a shaft, whereby these three shafts concentrically surround or enclose one another and thus are nested within one another.

It is now in the sense of the present invention to provide an arrangement for the detection of a shaft break in a gas turbine, which is especially suitable for the detection of a shaft break of the shaft connecting the medium pressure turbine rotor with the medium pressure compressor rotor. Namely, if this shaft breaks or fractures, then the medium pressure compressor can no longer take up any work or power from the medium pressure turbine, which can lead to an over-speeding rotation of the medium pressure turbine. Because such an over-speeding rotation of the turbine can lead to substantial damage of the aircraft engine, a shaft break must be surely detected.

In the sense of the present invention it is proposed to position an actuating element 18 between the rotor of the medium pressure turbine (not shown) and the stator of the low pressure turbine 11, whereby the actuating element 18 is positioned between the last runner or rotor blade ring of the medium pressure turbine as seen in the flow direction and the first guide vane ring 10 of the low pressure turbine 11 as seen in the flow direction in the illustrated example embodiment. In that regard, the actuating element 18 is positioned lying radially inwardly relative to the flow channel within the gas turbine, adjacent to or neighboring a rotor disk (not shown) of the last rotor blade ring as seen in the flow direction of the medium pressure turbine (not shown). The actuating element 18 is slidably guided in a radially inwardly lying seal structure 19 of the stator of the low pressure turbine 11 to be slidable in the flow direction or in the axial direction. The axial slidability of the actuating element 18 is represented by a double arrow 20 in FIG. 1. As can be seen in FIG. 1, an elastically deformable spring element 21 engages on one end of the actuating element 18, whereby the curvature of the spring element 21 directly depends on the axial position of the actuating element 18.

In connection with a shaft break of the shaft, which connects the medium pressure turbine positioned upstream from the low pressure turbine with the medium pressure compressor, the rotor of the medium pressure turbine is moved in a direction toward the stator of the low pressure turbine 11 due to the pressure differences within the medium pressure turbine, and thus is moved toward the rear or in the through-flow direction (arrow 17), so that the rotor of the medium pressure turbine contacts the actuating element 18 and moves the actuating element 18 in the axial direction in the direction of the arrows 17. In the illustrated example embodiment, the rotor disc of the last rotor blade ring of the medium pressure turbine as seen in the flow direction operates or actuates the actuating element 18 allocated to the first guide vane ring 10 of the low pressure turbine 11 as seen in the flow direction.

The actuating element 18 cooperates with a transmission element 22, in order to transmit a shaft break detected by the actuating element 18 to a switching element 23, which is secured radially outside on the housing 14 of the gas turbine. As can be seen in FIG. 1, the transmission element 22 is slidably guided to be slidable in the radial direction in the stator of the low pressure turbine 11, namely in the stator-side guide vane ring 10 of the low pressure turbine 11. The radial slidability of the transmission element 22 is visualized by a double arrow 24 in FIG. 1.

The transmission element 22 extends in the radial direction through the guide vane 12 of the guide vane ring 10 shown in FIG. 1, whereby the transmission element cooperates at a radially inwardly lying end 25 with the actuating element 18 and at a radially outwardly lying end 26 with the switching element 23. If, in connection with a shaft break in the area of the medium pressure system of the gas turbine, the rotor of the medium pressure turbine is moved in the direction of the arrows 17, and thereby the actuating element 18 is similarly axially slidingly displaced in the direction of the arrows 17, then a stronger bending curvature of the spring element 21 results, whereby the transmission element 22 is slidingly displaced toward the outside in the radial direction. In the illustrated example embodiment, the radially outwardly lying end 26 of the transmission element 22 cooperates with a spring element 27, which is deformed from the position illustrated with solid lines in FIG. 1 into the position illustrated with dashed lines in FIG. 1 and consequently actuates the switching element 23, in connection with a radially outward sliding displacement of the transmission element 22 as caused by a shaft break. The switching element 23 is connected with a module 28 of a control arrangement of the gas turbine, which interrupts a fuel supply or feed to the combustion chamber of the gas turbine in connection with a detected shaft break.

In the sense of the present invention, an arrangement for the detection of a shaft break in a gas turbine is thus proposed, in which a shaft break is detected in a mechanical way and manner with a radially inwardly lying actuating element 18, and whereby the shaft break detected by the actuating element 18 is transmitted in a mechanical manner with a transmission element 22 to a switching element 23 positioned radially outside on the housing 14 of the gas turbine. Radially inwardly lying or difficult-to-access structural assemblies of the inventive arrangement for the detection of a shaft break are based on a purely mechanical operating principle and are therefore very robust. Electrical or electronic assemblies of the inventive arrangement, such as, for example, the switching element 23 or the module 28, are secured exclusively outside on the housing 14 of the gas turbine and are thus easily accessible for maintenance work.

In the example embodiment of FIG. 1, the transmission element 22 cooperates at a radially inwardly lying end 25 via a spring element 21 with the actuating element 18, and cooperates at the radially outwardly lying end 26 via the spring element 27 with the switching element 23. At this point it is mentioned that both at the radially inwardly lying end 25 as well as at the radially outwardly lying end 26 the transmission element 22 can cooperate directly with the actuating element 18 or the switching element 23 respectively. Thus, for example, the actuating element 18 can have a conical or tapered section on a section at which the same cooperates with the transmission element 22, in order to ensure a radial sliding displacement of the transmission element 22 in the direction of the double arrow 24 upon an axial sliding displacement of the actuating element 18 in the direction of the double arrow 20.

The spring element 27 is preferably embodied as an over-center-snapping cup spring. Thereby, in the case of a shaft break, the sliding displacement of the transmission element 22 radially toward the outside is accentuated and converted into a permanent snapping-over of the cup spring. This increases the security in the actuation of the switching element 23.

The invention claimed is:

1. Gas turbine machine comprising at least two compressors, at least one combustion chamber, at least first and second turbines, and an arrangement for the detection of a shaft break on a rotor of the first turbine, wherein the second turbine is positioned downstream from the first turbine, characterized in that an actuating element (18) is positioned between the rotor of the first turbine and a stator of the second turbine (11) and lying radially inwardly adjacent to a rotor disc of the last rotor blade ring, as seen in the flow direction, of the first turbine, and is slidably guided in a radially inwardly lying seal structure (19) of the stator of the second turbine (11) to be slidable in the axial direction or in the flow direction, in that a transmission element (22) is slidably guided in the stator of the second turbine (11) to be slidable in the radial direction, in that the transmission element (22) cooperates at a radially inwardly lying end (25) with the actuating element (18) and cooperates at a radially outwardly lying end (26) with a switching element (23) that is positioned lying radially outwardly on a housing (14) of the gas turbine machine, and in that at least one elastically deformable spring element (21, 27) is arranged for mechanical coupling between the actuating element (18) and the transmission element (22) and/or between the transmission element (22) and the switching element (23).

2. Gas turbine machine according to claim 1, characterized in that the transmission element (22) is guided in a first guide vane ring (10), as seen in the flow direction, of the second turbine (11).

3. The gas turbine machine according to claim 1, wherein said gas turbine machine is an aircraft engine, said first turbine is a medium pressure turbine, and said second turbine is a low pressure turbine.

4. A gas turbine machine comprising:
a first turbine including a rotor shaft and a first turbine rotor connected to said rotor shaft;
a second turbine including a second turbine stator arranged downstream from said first turbine rotor with respect to a gas flow direction through a gas flow channel of said gas turbine machine;
a housing that encloses circumferentially around said gas flow channel, said first turbine and said second turbine;
a switching element arranged radially outwardly on said housing;
an actuating element that extends from said second turbine stator toward said first turbine rotor, and that is slidably guided in said second turbine stator to be slidable in a first sliding direction having at least a directional component thereof extending parallel to said gas flow direction or parallel to an axis of said first and second turbines;
a transmission element that is slidably guided in said second turbine stator to be slidable in a second sliding direction having at least a directional component thereof extending radially relative to said axis, wherein a radially inner end of said transmission element is mechanically coupled directly or indirectly with said actuating element and a radially outer end of said transmission element is mechanically coupled directly or indirectly with said switching element such that if said rotor shaft breaks then said first turbine rotor will strike against and cause a sliding displacement of said actuating element in said first sliding direction which will cause a sliding displacement of said transmission element in said second sliding direction which will cause a switching actuation of said switching element; and
at least one elastically deformable spring element interposed between and mechanically coupling said actuating element and said radially inner end of said transmission element, and/or interposed between and mechanically coupling said radially outer end of said transmission element and said switching element.

5. The gas turbine machine according to claim 4, wherein said at least one elastically deformable spring element comprises a first elastically deformable spring element interposed between and mechanically coupling said actuating element and said radially inner end of said transmission element.

6. The gas turbine machine according to claim 5, wherein said first elastically deformable spring element includes a curved spring portion that bears against said radially inner end of said transmission element, and that has a curvature which depends on a sliding displacement position of said actuating element.

7. The gas turbine machine according to claim 5, wherein said at least one elastically deformable spring element further comprises a second elastically deformable spring element interposed between and mechanically coupling said radially outer end of said transmission element and said switching element.

8. The gas turbine machine according to claim 4, wherein said at least one elastically deformable spring element comprises an elastically deformable spring element interposed between and mechanically coupling said radially outer end of said transmission element and said switching element.

9. The gas turbine machine according to claim 8, wherein said elastically deformable spring element is an over-center-snapping spring with two stable oppositely curved positions in opposite directions relative to an unstable center position.

10. The gas turbine machine according to claim 8, wherein said elastically deformable spring element is a cup spring.

11. The gas turbine machine according to claim 4, wherein said switching element is an electrical or electronic switching element.

12. The gas turbine machine according to claim 4, further comprising a combustion chamber, a fuel supply system arranged and adapted to supply a fuel to said combustion chamber, and an electronic control adapted and connected to said fuel supply system so as to control said fuel supply system, wherein said switching element is connected to said electronic control and is adapted to switch said electronic control so as to shut off said fuel supply system upon actuation of said switching element.

13. The gas turbine machine according to claim 4, wherein said actuating element, said transmission element, and said at least one elastically deformable spring element are purely mechanical elements.

14. The gas turbine machine according to claim 4, wherein said actuating element is positioned radially inwardly adjacent to a rotor disc of a last rotor blade ring, as seen in said gas flow direction, of said first turbine.

15. The gas turbine machine according to claim 4, wherein said second turbine stator includes a radially inwardly lying seal structure, and said actuating element is slidably guided in said radially inwardly lying seal structure.

16. The gas turbine machine according to claim 4, wherein said first sliding direction of said actuating element extends parallel to said gas flow direction or parallel to said axis.

17. The gas turbine machine according to claim 4, wherein said second sliding direction of said transmission element extends radially relative to said axis.

* * * * *